…

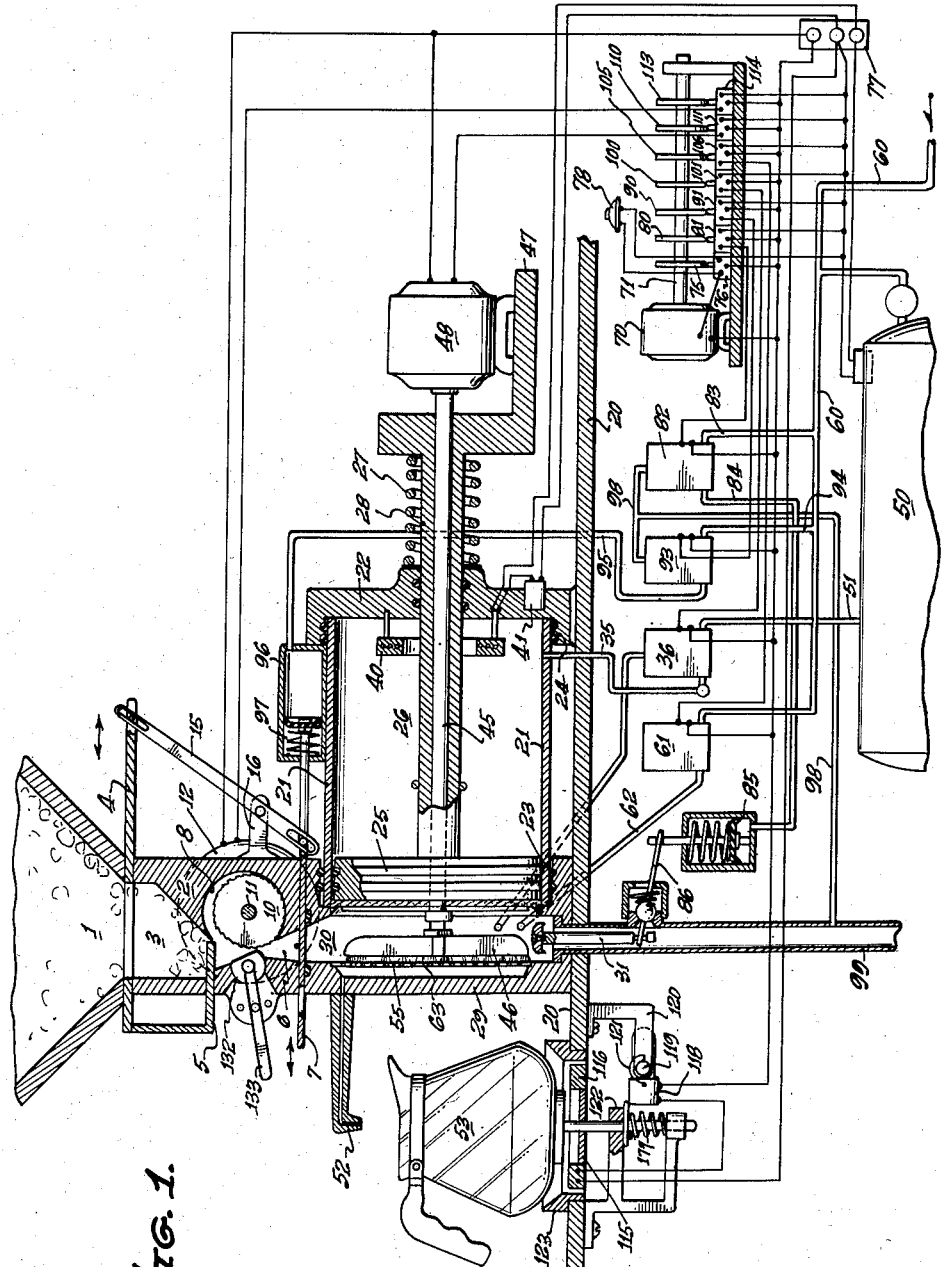

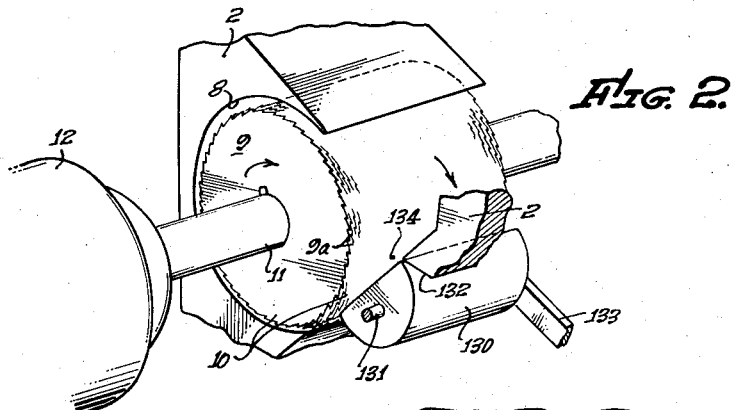
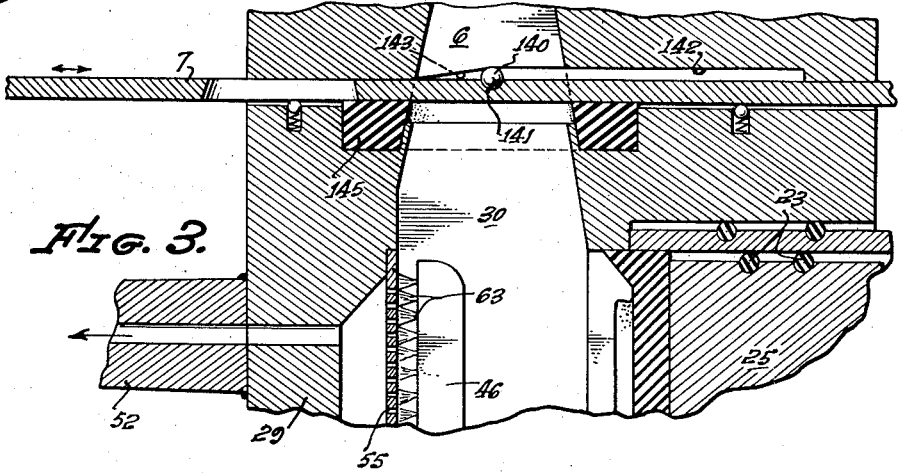
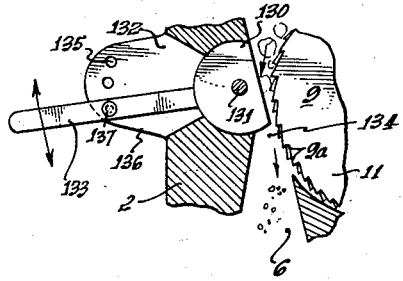
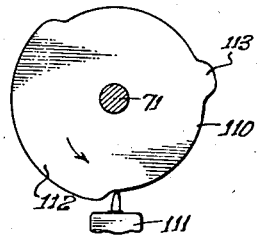
James F. Davis,
INVENTOR,
BY [signature]
ATTORNEY.

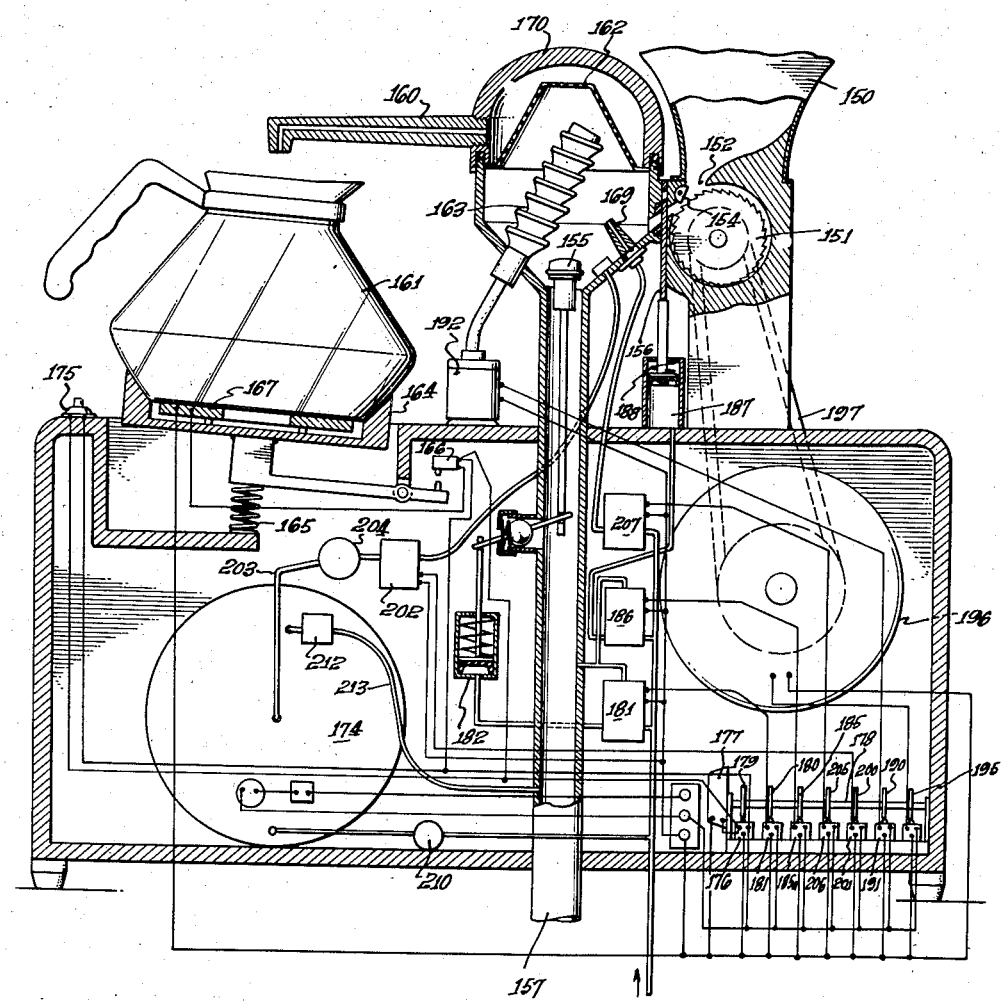

United States Patent Office 2,868,109
Patented Jan. 13, 1959

---

2,868,109

COFFEE MAKER

James F. Davis, Northridge, Calif.

Application December 13, 1954, Serial No. 474,689

10 Claims. (Cl. 99—282)

This invention relates to coffee making machines and has particular reference to an automatic, time and operation controlled coffee making device.

To brew good coffee there are some simple basic requirements, namely:

A good blend of properly roasted beans freshly ground; mixing these coffee grounds in a clean receptacle with water heated to about 200 degrees F.; allowing the water to mix with the grounds for a long enough interval to get the desired flavor elements of the grounds into solution; filtering the spent grounds from the brew to give it clarity without further sedimentation. Coffee thus made should be used promptly after brewing for it retains its peak flavor for only a matter of minutes.

Many restaurants serve poor coffee for failure to abide by one or more of these simple requirements. One failure is often beyond their control. It lies in the use of stale grounds. It is the general practice of coffee suppliers to deliver pre-ground coffee once a week in paper bags. Once ground and exposed to air, coffee grounds deteriorate rapidly. On the other hand, a roasted coffee bean—even though exposed to air—retains its essential flavor elements for several weeks. So the advantages of a machine that stores coffee beans and grinds a prescribed amount fresh for each batch of brew are obvious. In terms of supply, deliveries need not be made so often, for the hopper of a machine can be made large and an additional reserve can be maintained without fear of the supply turning stale. In terms of brewing, as mentioned above, a prime requisite is provided.

The objects of the invention are: To provide a machine that will simplify the job of the coffee supplier by cutting down on the frequency of his deliveries and to aid the coffee user by providing "automation" to his brewing requirements. To speedily, automatically, accurately and consistently perform all the procedures for making the best possible coffee brew; to provide a machine designed to hold stored therein a quantity of coffee beans sufficient to last over an extended period of time; to provide integrally within the machine means to measure accurately a desired quantity of coffee beans to be ground with each operation of the machine; to provide integrally within the machine a grinder which will be able to grind this measured amount of beans very quickly and be able forcibly to inject the ground coffee into the brewing chamber of the machine; to provide integrally within the machine between the grinder and the brewing chamber a valve which will permit the unobstructed passage of the dry coffee grounds into the brewing chamber and close coupling of the grinder to the brewing chamber; seal off the grinding mechanism and bean supply from harmful moisture; to make and assure this seal despite the presence of fine dry coffee particles or any packing of the grounds in the passage between the grinder and brewing chamber; to provide within the machine a means to store a quantity of water and maintain it at the proper temperature for coffee brewing; to provide within the machine means for very accurately controlling the amount of water to be mixed with the ground coffee and be dispensed from the machine as brewed coffee; to provide within the machine the means to combine the water and the grounds for the proper brewing interval; to provide within the machine the means to stir the mixture during part of the brewing interval; to provide a means for impelling the brewed coffee from the machine into a decanter; to provide means to filter the grounds from the brew just prior to the passing of the brew from the machine; to provide a means to clean the brewing chamber of grounds after the brewed coffee has been discharged; to provide a means to keep the brew warm after it has passed from the machine; to provide the means for automatically timing and controlling all the above actions, the whole cycle to take approximately four minutes.

These and other objects of the invention, together with the many advantageous features thereof, will be apparent from the following detailed description and by referring to the accompanying drawings in which preferred forms of the invention are illustrated.

In the drawings:

Fig. 1 is a side elevational view of a coffee making machine embodying the invention;

Fig. 2 is a fragmentary perspective view of the coffee grinding mechanism of the machine;

Fig. 3 shows, on a much larger scale, details of the machine, the importance of which is hereinafter fully described;

Fig. 4 shows one of the cams by means of which the operation of the machine is automatically controlled;

Fig. 5 is a fragmentary view added more clearly to show the manner in which the coffee grinding mechanism may be adjusted to vary the texture of the grind; and Fig. 6 is a side elevational view of a somewhat modified form of the machine of the invention.

The device of the invention is for the sake of simplicity and clearness diagrammatically outlined in the drawings. The device, in the form illustrated in Fig. 1, includes a hopper 1 of a size to hold stored therein a considerable supply of roasted coffee beans. This hopper is shown mounted on a framing 2 which is recessed from the top thereof to provide a measuring chamber 3 and the passage from the hopper to this chamber is controlled by a sliding valve 4. Beans are free to drop into this chamber while the valve remains open and the beans are held therein by a valve which is an extension of the valve 4. A passage 6 leads downwardly through the framing and it is at the bottom thereof controlled by a normally closed valve 7. The passage 6 is shown laterally extended to form a cylindrical chamber 8, in which a coffee bean cutting element 9 is rotatably seated. This element consists of a series of circular saws 10 which are mounted on a shaft 11 and a motor 12 is connected to rotate the shaft, see also Fig. 2.

The three valves are operatively interconnected by means of a lever 15 which is pivotally mounted on a bracket 16 of the framing and this lever is operated in the manner which will be explained presently to close the hopper valve 4 and to open the passage valves 5 and 7. The movement of the valve 4 causes the extension 5 thereof to recede and in receding to permit the coffee beans to drop into the passage. The motor has been started prior to the time the passage is opened. The valves return to their normal positions after the coffee is ground and the motor is de-energized.

This grinding arrangement is integral with the machine. It is designed to grind the coffee very rapidly, which is essential to the function of this coffee maker. It is contained in the same housing that also contains the bean measuring chamber, the valve between the grinder and brewing chamber, and the front end of the water-supply and brewing cylinder. Like all the other operations of this machine, the grinder is controlled by the timing mechanism and the relation of the timing of valves 4, 5 and 7 is essential to the grinding operation. This is a very high speed cutter operated by a motor of relatively low power and torque. This grinder cannot be started against a load except with the use of a very powerful motor. A heavy, bulky motor is not practical. To avoid it, it is possible and desirable to use the arrangement herein described. When the valve 5 is closed, no beans are in the cutting chamber so the motor can start the cutting cylinder easily and bring it to full speed quickly. After this is done, valve 7 opens and thus operates the interconnected valves 4 and 5 simultaneously. Beans are now free to fall into the cutter—but only the beans in the measuring chamber, the desired predetermined amount, since valve 4 has prevented any further supply from entering the measuring chamber. The cutter cylinder is quite heavy and the momentum it has acquired plus the relatively small addition of power from the motor is adequate to keep it rotating at full speed during the bean pulverizing action. The width of the cutting cylinder—cutting across its full face— plus the speed of its rotation is the combination which makes the grinding so rapid. But the centrifugal force imparted to the beans at the moment of cutting is also essential to the function of the device. This force is needed to quickly impel the grounds past the valve 7 and into the brewing chamber.

The framing 2 extends downwardly to the base 20 of the machine and it is cylindrically recessed to receive one end of a tube 21. A second framing 22 is mounted on the base and it is shaped to receive the other end of this tube. O-rings 23, 24 are provided tightly to seat the tube in the framings and the parts combine to form a cylinder within which a piston 25 is seated for reciprocating movement. The space 26 behind the piston is filled with heated water under pressure and the water pressure maintains the piston advanced against the tension of a spring 27, seated on the piston rod 28. It is important to note that the front wall 29 of the framing 2 is spaced away a distance from the piston to provide in front thereof a chamber 30 in which the ground coffee is free to descend while the cutters of the grinder are in operation. A normally open drain valve 31 is placed at the bottom of the chamber and this valve will, as hereinafter explained, be closed at the time the passage valve 7 opens.

A conduit extends from the space 26 behind the piston to the space 30, which space hereinafter is referred to as the coffee brewing chamber. The passage through this conduit is controlled by a valve 36. This valve is now opened permitting the spring 27 to draw the piston rearwardly and during this movement to force a predetermined amount of the water behind the piston through the conduit 35 to the brewing chamber. The water within the cylinder has been kept at the proper temperature by an electric heater 40 and a thermostat 41. In addition, it is necessary to agitate the hot water entering the brewing chamber for a period of time. This may be done by seating a shaft 45 for rotation within the piston rod 28 and to mount fan blades 46 on the front end of this shaft. The rear end of the piston rod is shown fitted with a platform 47 on which an electric motor 48 is mounted in position to rotate the shaft. This motor is energized to start the fan at the time the hot water is transferred to the brewing chamber and it continues to agitate the brewing mixture for a relatively long period of time, at the end of which the fan is stopped. The brewing coffee now remains undisturbed until the brewing is completed, allowing the coffee grounds to settle to the bottom of the chamber.

The water used to brew the coffee comes from the urban water supply line, or from any other source of water under pressure, and it passes through a primary water heating tank 50 and a conduit 51 to the valve 36. This valve is at the end of the brewing period reset to open passage for the water from the tank 50 through the conduit 35 to the space 26 behind the piston. The incoming water will now very slowly advance the piston, during which movement the coffee within the brewing chamber will be discharged through a spout 52 at the top of the chamber into a pitcher 53, or other suitable coffee receptacle. A fine stainless steel filter screen 55 in the front wall of the chamber will during this coffee dispensing movement effectively prevent discharge of any coffee grounds into the decanter.

It now becomes necessary thoroughly to flush out the brewing chamber and a conduit 60 leads from the source of water through a valve 61 and a conduit 62 to the chamber. This valve and the drain valve 31 are now opened causing the water entering the chamber to dislodge all residue therein and quickly to flush it out through the drain. During this brief flushing period, it is advisable to start the fan more thoroughly to agitate the outdraining mixture. It is also of considerable advantage to place brushes 63 on the fan blades 46 for contact with the filter screen 55 during this cleansing period. The valve 61 is again closed at the end of the flushing period and the coffee maker is ready for another brew.

It should be clear from the foregoing brief description that the timing of the valves controlling the various operations above briefly outlined is most important. The time required for the entire cycle of operations must be four minutes or less and the various operations must be successively completed within this period of time. A timing motor 70 is provided for this purpose and this motor is in any suitable manner, as by a train of gears, connected to impart one complete rotation to a shaft 71 in the four minute period. A series of cams are mounted on this shaft in position to actuate a corresponding series of micro switches which, in turn, are cut into circuits controlling valve operating solenoid magnets, all as will now be briefly described.

The first cam, 75, operates a micro switch 76 which is cut into a circuit from a source of energy 77 to operate the timing motor 70. A push button starting switch 78 in this circuit is first manually depressed to close the timing motor circuit which remains closed during the single rotation of the camshaft and then automatically opens. The second cam 80 is designed to operate a similar micro switch 81 which is cut into a circuit through a solenoid magnet controlling a valve 82. Since such solenoid controlled valves are well known and commonly used, it is not thought necessary to burden the case with a detailed description thereof. A conduit 83 extends from the cold water inlet conduit 60 through this valve and a conduit 84 to a hydraulic ram 85 which, in turn, through a lever 86 is operatively connected to close the drain valve 31. The cam is shaped to close the circuit through the solenoid magnet shortly after the timing circuit is closed and to maintain it closed until the flushing of the brewing chamber is commenced.

The third cam 90 is shaped similarly to operate a micro switch 91 to close a circuit through the solenoid magnet of a valve 93. A conduit 94 extends from the intake conduit 60 through this valve and a conduit 95 to a hydraulic ram 96 which, in turn, is connected to operate the lever 15 to close the valves 4, 5 and 6 and to open the valve 7. The cam 90 is designed to close the circuit the moment the drain valve is closed and to maintain the circuit closed during the very short period of time required to grind the coffee. The circuit then instantly opens, permitting the spring 97 of the ram 96 to return the valves 4, 5 and 7 to their former positions. The water within the ram casing is during this return movement of the ram free to discharge through a conduit 98 to the drain 99 of the coffee maker. The grinder motor 12 has, as above stated, been energized during this perior to grind the coffee. The means by which this motor is controlled will be hereinafter explained.

The fourth cam, 100, similarly operates a micro switch 101 to close a circuit through the solenoid magnet of the valve 36 the moment the valve 7 below the coffee grinder is closed thereby to open the passage through the conduit 35 for water from the cylinder behind the piston to flow into the brewing chamber in front thereof, as above described.

The sixth cam 110 is designated to operate a micro switch 111 to close a circuit through the agitator motor 48 and to maintain this motor running for a period of time. The micro switch is at the end of this period, which is about two minutes, released by the cam to open the circuit. At the end of this agitating period the brewed coffee is, as above pointed out, left undisturbed for a period of about one minute to permit the coffee grounds to settle. The cam 100 will, at the end of this period, release the micro switch 101 to open the transfer valve circuit and so to release the valve for return to its initial position. Heated water will now enter the cylinder through the conduit 35 to advance the piston and in advancing to discharge the coffee through filter screen 55 and out the spout 52.

The brewed coffee has now been dispensed and it becomes necessary to flush out the brewing chamber. The fifth cam 105 is for this purpose shaped to actuate a micro switch 106 to close the circuit through the magnet of the valve 61. This magnet will now open the valve to permit cold water from the inlet conduit 60 to flow through the conduit 62 to the brewing chamber. It becomes necessary at the same time to open the drain valve 31 and the cam 80 is shaped at this time to release the micro switch 81 to open the drain valve circuit and so to restore the valve to open position. The inrushing cold water will thoroughly flush out the brewing chamber and the residue of the coffee brewing will discharge freely through the relatively large drain pipe.

The seventh cam 113 actuates a micro switch 114 to close the circuit through the coffee grinder motor at the time the valves 4 and 7 are operated to admit coffee beans to the grinder, as above described.

As above pointed out, it is advisable also during the flushing period to operate the agitator fan and the cam 110 is shaped again to actuate the micro switch 111 to start the fan at the beginning of the flushing period. The cam will release the switch to reopen the circuit at the end of the flushing period. The cam shaft will now have completed its rotation, the timing circuit will open and all the valves will have returned to their initial positions.

The coffee pitcher stands on a platform 115 in which is seated a heating element 116 and a spring 117 normally maintains this platform in the elevated position shown in full outline in the drawing. A mercury switch 118 is at 119 shown pivotally hung on a bracket 120 of the base 20. This switch is cut into a circuit from the source of energy 77 and it is by a spring 121 held in its normal, open position against a flange 122 of the platform. But when the coffee pours into the pitcher, it is found that the added weight gradually will compress the spring 117 until the pitcher comes to rest on the support ring 123 of the platform. The flange 122 will during this movement swing the switch on its pivot into circuit closing position to energize the heating element which then will maintain the coffee at the proper temperature. Upon removal of the pitcher, the platform will be free to rise and the spring 121 will return the switch to its off-position.

The cams which control the various circuits must each be correctly shaped properly to time the operations of the micro switches. Illustrative of this, I have in Fig. 4, shown the cam 110, which controls the operation of the agitator fan. This cam is fitted with a projection 112 which, at the time the hot water enters the brewing chamber, will depress the button of the micro switch 111 to close the circuit through the fan motor 48. This projection is of the proper length to maintain the fan in motion until the transfer of the hot water is completed and the brewing completed. A second projection, 113, is placed on the cam again to actuate the micro switch after the coffee has been dispensed and to maintain the circuit closed during the flushing period.

It was above stated that the coffee grinder consists of a series of circular saws 10 which are mounted on the motor shaft 11. The teeth of these saws will, when relatively staggered as indicated at 9a in Fig. 2, swiftly and uniformly cut the beans. Means should be provided for adjusting the device to determine the fineness of the coffee grind and this may be done by mounting a substantially semi-cylindrical block or bar 130 for rotation on a shaft or pivot 131 seated in a cylindrical recess 132 of the framing 2, see also Fig. 5. A handle 133 extends from the bar for manual operation to turn the bar on its pivot thereby to vary the width of the passage 134 between the bar and the teeth of the saws. A concentric row of sockets 135 are sunk into the surface of a lug 136 projecting from the framing and a plunger 137 is mounted in the handle for insertion into the socket corresponding to the desired fineness of the grind.

It is very important to have the valve 7 tightly close the passage 6 to the brewing chamber and this may, as indicated in Fig. 3, be done by seating a ball or roller 140 in socket 141 of the valve at both sides of the passage. Grooves 142 are cut into the surface of the framing above the valve and the front ends of these grooves are at 143 shown downwardly tapered. Only one ball and groove is for the sake of simplicity shown in the drawing but it is to be understood that two sets of balls and grooves must be provided in order evenly to apply pressure to the valve. When so constructed, it is seen that the balls will engage these tapered portions of the grooves when the valve is advanced into the closing position indicated in Fig. 3. The valve will in such manner become to tightly pressed against the surface of the framing that all danger of water leaking through the valve during the flushing of the brewing chamber is eliminated. It may in addition be found advantageous to place a valve seat 145 below the valve. This seat should be composed of somewhat compressible material which is not affected by the fluids in the mixing chamber.

It is seen from the foregoing description that I have provided a machine which will automatically dispense perfectly brewed coffee of precisely uniform volume; but while I have succeeded in accomplishing such uniformly perfect brewing by means of the cylinder and piston combination above described, it has been found possible to produce similar results with unvarying regularity by means of the structural combination which will now be described.

In this modified form of the invention, coffee beans are held stored in a hopper 150 for delivery to a grinder in the form of a circular cutter the blades of which are identical with the above described saws 9. The cutter 151 of this device is operable for a predetermined interval, this interval being just enough to allow a grinding of a desired quantity of coffee. The fineness of the grind is determined by the grind regulating member 154 which is identical with the aforenamed regulating bar 130. The ground coffee is impelled by the force of the cutter through a passage 152 into the brewing chamber. Valve 156 is opened to admit the ground beans into the chamber in a manner identical to above described valve 7. A normally opened valve 155 is placed at the bottom of the chamber and it is, like the drain valve 31, moved into closed position before the ground coffee is injected into the brewing chamber. This chamber differs from the chamber above described in that it is smaller, the piston has been eliminated and other means are provided for dispensing coffee of uniform volume therefrom as will hereinafter be described. After the predetermined interval of grinding, valve 156 is closed and water heated to the proper temperature is slowly admitted into the chamber. The upper end of the brewing chamber is shown closed by means of a dome-shaped cap 170, into which the conical filter screen 162 rises. Spout 160 is placed in this cap in a manner to provide an air space within this cap above this outlet. This space is very important. As the heated water enters the brewing chamber, the line pressure on the water is thus released and the water vaporizes to a degree. Initially as the water enters the chamber this vapor escapes out the spout, but as the water continues to rise and ultimately flows out the spout 160, these vapors are held in the dome. The effect of this is to eliminate all sputtering in the outflow of the spout. The rate of the flow of hot water into the brewing chamber allows for the mixture of the water and coffee for sufficient time to get all the desired elements of the grounds into solution. The conical filter screen 162 of fine stainless steel mesh removes the grounds from the brew prior to its passing out the spout.

The conical shape of this filter is essential. Use of a disk filter does not permit sufficient filter area. Use of a cylindrical filter has large area but the coffee tends to rise to the top and the incoming water passes around the grounds and out the spout without contacting the coffee grounds. The cone shape increases the filter area to prevent the grounds from jamming the filter and the water has to pass through the grounds to get out the spout—so it gets all the flavor from the grounds. In addition, an agitator 163 is provided. This agitator takes the shape of a helical screw which, when rotated, counteracts the tendency of the rising water to hold the grounds against the filter screen by drawing the grounds downwardly away from the screen for more thorough mixing with the flowing water.

The timing motor and the cams, micro-switches and solenoid valves it controls is almost identical to the previously described operation with the two very important variations. Whereas timer motor 70 operated from the start to the finish of the complete cycle of the machine in controlled, timer motor 177 of this modified device operates on an interrupted cycle. A switch 166 is cut into the timing circuit. Switch 166 is actuated by the weight of the decanter into which the brewed coffee flows. The purpose of this is to accurately control by weight the volume of brew produced despite variations in the orifices through which the hot water flows which varies the time it takes for the decanter to be filled. The brewing cycle is thus controlled as follows: A starting switch 175, similar to the starting switch 78, is depressed manually. This starts the timer motor 177 which in turn commences to turn the shaft 178. Cam 179 almost immediately closes timer switch 176 so the manual pressure closing switch 175 can be released. The operation thus continues automatically. Cam 180 closes switch 181 to operate solenoid valve 181ª to actuate hydraulic ram 182 to close the drain 155. Cam 185 then closes switch 185ª to actuate solenoid valve 186 to operate hydraulic ram 187 to open valve 156 for passage of the ground coffee into the brewing chamber. Cam 195 then closes switch 195ª to operate grinder motor 196 which through belt linkage 197 turns blades 151 to grind the coffee. After a short predetermined interval, the grinder motor is deenergized through the action of cam 195. Simultaneously valve 156 closes due to action of cam 185. Next cam 200 closes switch 201 which opens solenoid valve 202 thus permitting a slow flow of hot water from pressure tank 174 to pass through conduit 203 and pressure regulator 204 and then to enter chamber 153.

Almost immediately thereafter cam 179 opens switch 176 and thus stops the timer motor 177. Hot water continues to flow into the brewing chamber, out the spout 160 into decanter 161 which is supported by pivotally mounted platform 164 which, when the required amount of coffee has entered the decanter, will, due to the weight of the coffee therein, move downwardly against the accurately set tension of spring 165 to close micro-switch 166. This switch is linked with switch 176 in such manner as to again start timer 177 which again turns shaft 178. In a moment this makes cam 200 open switch 201 and stop the flow of hot water into the brewing chamber. Cam 180 opens switch 181 which de-energizes solenoid valve 181ª which permits the spring in ram 182 to act to open the drain. Cam 205 then closes switch 206 to open solenoid valve 207 to permit cold water from the main water supply line to pass through nozzle 169, the action of which is to flush the grounds in the chamber 153 out the drain 157 and into the main sewer line. After the flushing interval the cams shut off the flushing action, the agitator action and the timer motor and the machine is ready to repeat its cycle.

The drain valve will now be opened and cold water will be forced through a jet 169 upwardly into the brewing chamber while the agitator by continued rotation draws all coffee residue into the drain pipe. The micro-switch 166 opens upon removal of the pitcher and all the mechanisms return to their original positions.

The upper end of the brewing chamber is shown closed by means of a dome-shaped cap 170, into which the conical filter screen rises and the inlet to the spout 160 is placed in this cap a distance above the base of the filter screen to provide an air space within the cap above this inlet. The air within this space becomes somewhat compressed as the discharging coffee reaches the top of the inlet. This is important in that the air which has become somewhat compressed during the coffee brewing and dispensing period, now is free to expand and in expanding to stop the flow of coffee into the spout the moment the micro-switch 166 is closed to check the flow of heated water to the chamber. Except for this pneumatic control, sputtering or leakage through the spout might occur. This pneumatic control is even more important in preventing leakage through the spout during the subsequent flushing of the brewing chamber.

The various mechanisms by means of which this modified form of the invention is capable of functioning may remain substantially as above described. Thus a similar starting switch 175 is depressed to close a timer switch 176 to start timer motor 177 which, in turn, commences to rotate the cam shaft 178. The cam 179 of this shaft will now maintain the switch 176 closed during the single cam shaft rotation required for the coffee making and dispensing as well as the flushing of the brewing chamber. The cam 180 controls the operation of valve 181 which, through the hydraulic ram 182, is connected to close the drain valve 155. Cam 185 closes switch 185ª to operate the valve 186 to permit water to enter the hydraulic ram 187 to open the valve 156 for passage of the ground coffee to the brewing chamber. The cam is shaped subsequently to release the valve and so to permit the spring 188 of the hydraulic ram again to close the valve. The water in the ram will now discharge into the drain pipe 157.

Cam 190 actuates switch 191 to close the circuit through the agitator motor 192. Cam 195 controls the circuit through the grinder motor 196 which for the sake of clearness is by a belt 197 shown connected to rotate the grinder. But this motor may be directly connected thereto as shown in Fig. 1. The cam is shaped again to release the switch thereby to open the circuit through the grinder motor at the end of the period required for the grinding operation. Cam 200 closes its switch 201 to operate a valve 202 to permit the heated water from the pressure tank 174 to pass through conduit 203 and slowly to enter the brewing chamber after the grinder valve 156 has been closed. A pressure regulator 204 should be placed in this conduit correctly to control the passage therethrough. The cam is shaped again to close the valve 202 at the time the filled pitcher descends to close the circuit through the micro switch 166. Cam 205 closes switch 206 to open valve 207 for passage of cold water under pressure through the nozzle 169 into the brewing chamber.

All of these operating and control mechanisms remain substantially as described in connection with the coffee maker illustrated in Fig. 1. It is for this reason not thought necessary to enter into detailed description of every feature thereof. I have, however, in Fig. 6, shown additional features which also may be embodied in the device of Fig. 1. Of these may be named a filter 210 which is placed in the conduit of cold water to the water heating tank 174. I have found this quite important in cases where the purity of the water is uncertain. It is also of importance to maintain predetermined uniform pressure in this tank at all times and this may be done by placing a safety valve 212 in a conduit 213 from the tank to the drain pipe 157. Should the water pressure for some reason rise above a maximum which is found safe, this valve will automatically open to equalize the pressure. Other modifications, within the scope of the claims hereto appended may be embodied without departing from the scope of the invention.

I claim:

1. A coffee maker comprising, a cylinder, a piston in the cylinder, a spring urging the piston to the rear end of the cylinder, the space in front of the piston forming a brewing chamber, a water flow controlling valve, a conduit for water under pressure through the valve to the rear end of the cylinder to advance the piston against the pressure of the spring, a thermostatically controlled water heating element in the space behind the piston, a conduit from the valve to the other end of the cylinder, means for operating the valve to open a passage through the two conduits, pressure of the spring causing the piston to recede and in receding to force the water behind the piston through said passage into the brewing chamber, a coffee grinder, valves for admitting coffee ground by said grinder to the brewing chamber as the water enters therein, and means for timing the operation of all said valves and the coffee grinder.

2. A coffee maker comprising, a cylinder, a piston in the cylinder, a spring urging the piston to the rear end of the cylinder, the space in front of the piston forming a brewing chamber, a water flow controlling valve, a conduit for water under pressure through the valve to the rear end of the cylinder to advance the piston against the pressure of the spring, a conduit from the valve to the other end of the cylinder, means for operating the valve to open a passage through the two conduits, pressure of the spring causing the piston to recede and in receding to force the water behind the piston through said passage into the brewing chamber, a coffee grinder, means for adjusting said grinder to vary the fineness of the grinding, valves for admitting coffee ground by said grinder to the brewing chamber as the water enter therein, and means for timing the operation of all said valves and of the coffee grinder.

3. A coffee maker comprising, a cylinder, a piston in the cylinder, a spring urging the piston to the rear end of the cylinder, the space in front of the piston forming a brewing chamber, a water flow controlling valve, a conduit for water under pressure through the valve to the rear end of the cylinder to advance the piston against the pressure of the spring, a conduit from the valve to the other end of the cylinder, means for operating the valve to open a passage through the two conduits, pressure of the spring causing the piston to recede and in receding to force the water behind the piston through said passage into the space in front of the piston, a coffee grinder, valves for admitting coffee ground by said grinder to the brewing chamber as the water enters therein, said valve operating means being designed to return the valve to its initial position to cause the water from the pressure source again to advance the piston to dispense the brewed coffee from the chamber, and means for timing the operation of all said valves and of the coffee grinder.

4. A coffee maker comprising, a cylinder, a piston in the cylinder, a spring urging the piston to the rear end of the cylinder, the space in front of the piston forming a brewing chamber, a water flow controlling valve, a conduit for water under pressure through the valve to the rear end of the cylinder to advance the piston against the pressure of the spring, a conduit from the valve to the other end of the cylinder, means for operating the valve to open a passage through the two conduits, pressure of the spring causing the piston to recede and in receding to force the water behind the piston through said passage into the brewing chamber, a normally closed drain valve at the front end of the cylinder, a coffee grinder, valves for admitting coffee ground by said grinder to the brewing chamber as the water enters therein, said valve operating means being designed to return the valve to its initial position to cause the water from the pressure source again to advance the piston to dispense the coffee mixture from the chamber, means for flushing the chamber upon completion of the dispensing operation, means for opening the drain valve during the flushing operation, and means for timing the operation of all said valves and of the coffee grinder.

5. A coffee maker comprising, a cylinder, a piston in the cylinder, a spring urging the piston to the rear end of the cylinder, the space in front of the cylinder constituting a brewing chamber, a water flow controlling valve, a conduit for water under pressure through the valve to the rear end of the cylinder to advance the piston against the pressure of the spring, a conduit from the valve to the other end of the cylinder, means for operating the valve to open a passage through the two conduits, pressure of the spring causing the piston to recede and in receding to force the water behind the piston through said passage into the brewing chamber, a hopper for coffee beans, a bean measuring chamber below said hopper, a coffee grinder below said measuring chamber, a passage from the measuring chamber past the grinder to the space in front of the piston, means for adjusting the size of the opening through said passage, valves for admitting coffee grounds by said grinder to the brewing chamber as the water enters therein, and means for timing the operation of all said valves and of the coffee grinder.

6. A coffee maker comprising, a cylinder, a piston on a rod rearwardly extending through the cylinder, the space in front of the piston constituting a brewing chamber, a platform on the rear end of the rod, a motor on the platform, the shaft of the motor extending through the rod, a fan on the end of the shaft in front of the piston, a spring urging the piston to the rear end of the cylinder, a water flow controlling valve, a conduit for water under pressure through the valve to the rear end of the cylinder to advance the piston against the pressure of the spring, a conduit from the valve to the other end of the cylinder, means for operating the valve to open a passage through the two conduits, pressure of the spring causing the piston to recede and in receding to force the water behind the piston through said passage into the brewing chamber, a coffee grinder, valves for admitting coffee ground by said grinder to the brewing chamber as the water enters therein, and means for timing the operation of all said valves, the coffee grinder and the said motor.

7. A coffee maker comprising, a cylinder, a piston in the cylinder, a spring urging the piston to the rear end of the cylinder, the space in front of the piston constituting a brewing chamber, a water flow controlling valve, a conduit for water under pressure through the valve to the rear end of the cylinder to advance the piston against the pressure of the spring, a conduit from the valve to the other end of the cylinder, means for operating the valve to open a passage through the two conduits, pressure of the spring causing the piston to recede and in receding to force the water behind the piston through said passage into the brewing chamber, a normally closed drain valve at the front end of the cylinder, a screen in the front end of the cylinder, a coffee grinder, valves for admitting coffee ground by said grinder to the brewing chamber as the water enters therein, said valve operating means being designed to return the valve to its initial position to cause the water from the pressure source again to advance the piston to dispense the coffee mixture from the chamber, means for flushing the brewing chamber through said screen upon completion of the dispensing operation, and means for timing the operation of all said valves and the coffee grinder.

8. A coffee maker comprising, a cylinder, a piston in the cylinder, a spring urging the piston to the rear end of the cylinder, the space in front of the piston forming a brewing chamber, a dispensing spout in the chamber, a filter in the chamber for the coffee passing to the spout, a water flow controlling valve, a conduit for water under pressure through the valve to the rear end of the cylinder to advance the piston against the pressure of the spring, a thermostatically controlled water heating element in the space behind the piston, a conduit from the valve to the other end of the cylinder, means for operating the valve to open a passage through the two conduits, pressure of the spring causing the piston to recede and in receding to force the water behind the piston through said passage into the brewing chamber, a coffee grinder, valves for admitting coffee ground by said grinder to the brewing chamber as the water enters therein, and means for timing the operation of all said valves and the coffee grinder.

9. A coffee maker comprising, a cylinder, a piston in the cylinder, a spring urging the piston to the rear end of the cylinder, the space in front of the piston forming a brewing chamber, a filter in the chamber, a dispensing spout in the chamber, a water flow controlling valve, a conduit for water under pressure through the valve to the rear end of the cylinder to advance the piston against the tension of the spring, a thermostatically controlled water heating element in the space behind the piston, a conduit from the valve to the other end of the cylinder, means for operating the valve to open a passage through the two conduits, pressure of the spring causing the piston to recede and in receding to force the water behind the piston through said passage into the brewing chamber, a framing having at the upper end a hopper and a vertically directed passage from the hopper to the brewing chamber, horizontally operable valves dividing the passage into a measuring chamber and a grinding chamber, a coffee grinder in said grinding chamber, and means for timing the operation of all of said valves, the water heating element and the said grinder.

10. A coffee maker comprising, a cylinder, a piston in the cylinder, a spring urging the piston to the rear end of the cylinder, the space in front of the piston forming a brewing chamber, a water flow controlling valve, a conduit for water under pressure through the valve to the rear end of the cylinder to advance the piston against the pressure of the spring, a thermostatically controlled water heating element in the space behind the piston, a conduit from the valve to the other end of the cylinder, means for operating the valve to open a passage through the two conduits, pressure of the spring causing the piston to recede and in receding to force the water behind the piston through said passage into the brewing chamber, a hopper, a vertically directed passage from the hopper downwardly through the brewing chamber, valves dividing the portion of the passage between the hopper and the brewing chamber into a measuring chamber and a grinding chamber, a drain valve at the bottom of the brewing chamber, a coffee grinder in the grinding chamber, and means for timing the operation of all said valves, the thermostatic control and the grinder.

References Cited in the file of this patent

UNITED STATES PATENTS

| | | |
|---|---|---|
| Re. 22,879 | Peters et al. | May 13, 1947 |
| 1,189,035 | Asbury et al | June 27, 1916 |
| 1,467,778 | Paola | Sept. 11, 1923 |
| 1,667,690 | Hamm | Apr. 24, 1928 |
| 1,789,334 | Englung | Jan. 20, 1931 |
| 1,896,230 | Farago | Feb. 7, 1933 |
| 2,014,325 | Grilli | Sept. 10, 1935 |
| 2,149,270 | Burgess | Mar. 7, 1939 |
| 2,206,424 | Oyen | July 2, 1940 |
| 2,252,614 | Bowen | Aug. 12, 1941 |
| 2,392,452 | Baumann | Jan. 8, 1946 |
| 2,398,314 | Laereman | Apr. 9, 1946 |
| 2,447,692 | Evensen | Aug. 24, 1948 |
| 2,517,073 | Alvarez | Aug. 1, 1950 |
| 2,562,560 | Macartney | July 31, 1951 |
| 2,580,579 | Neenan | Jan. 1, 1952 |
| 2,662,664 | Decker | Dec. 15, 1953 |
| 2,811,098 | Pavlecka | Oct. 29, 1957 |